July 11, 1961   E. E. SCHOESSOW   2,992,176
POOL TYPE NUCLEAR REACTOR
Filed March 25, 1957   2 Sheets-Sheet 1
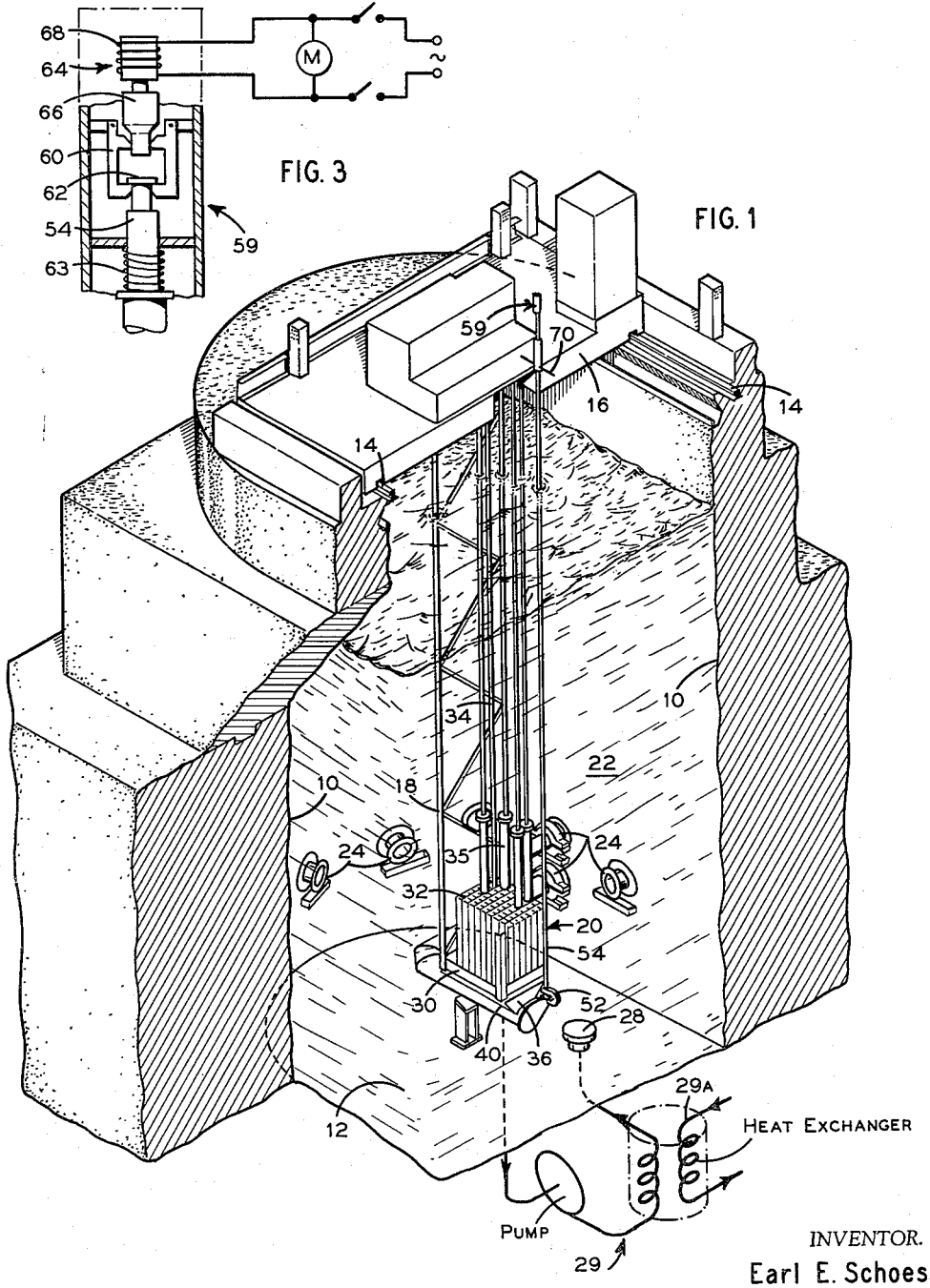
INVENTOR.
Earl E. Schoessow
BY
*J. P. Moran*
ATTORNEY

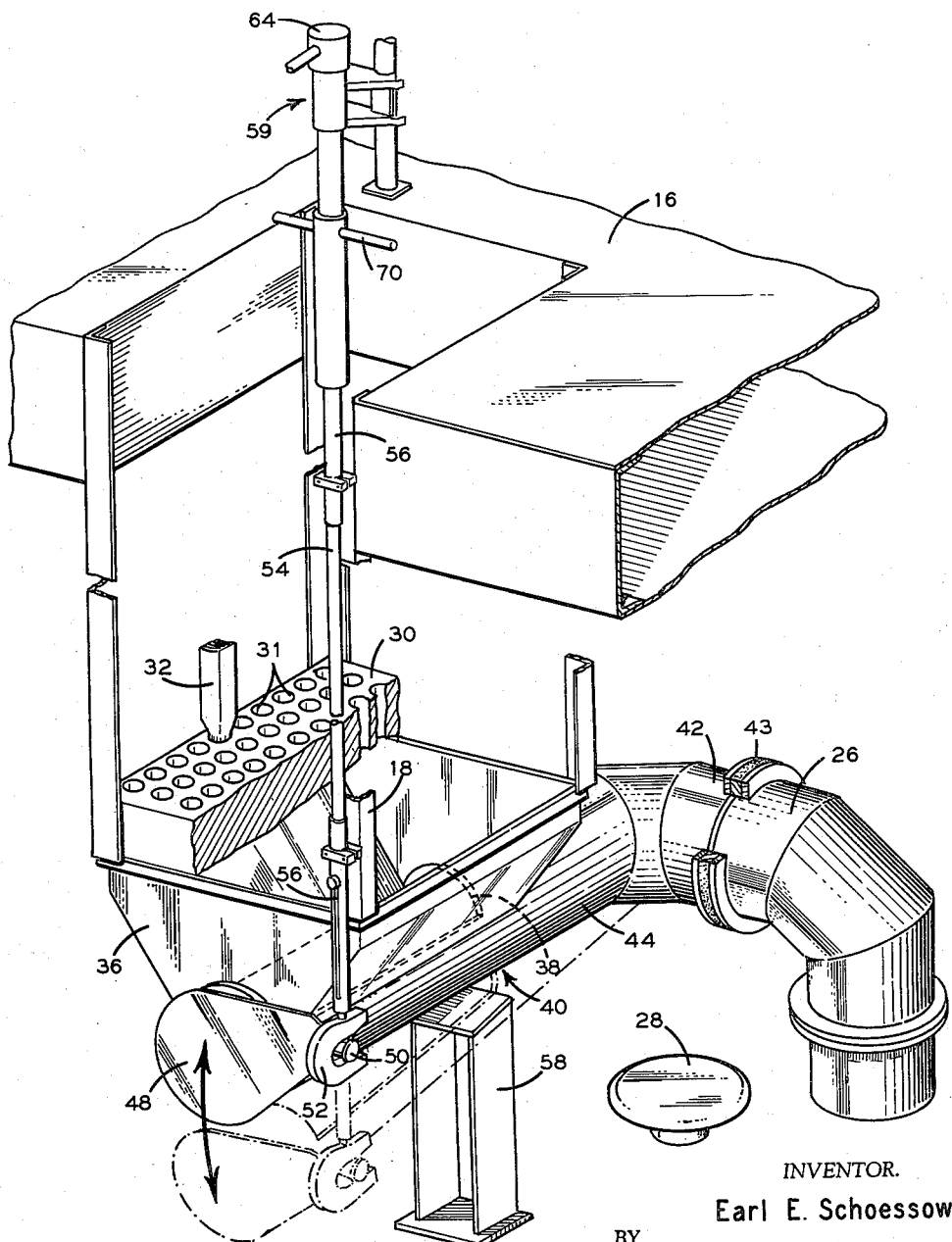

United States Patent Office 2,992,176
Patented July 11, 1961

2,992,176
POOL TYPE NUCLEAR REACTOR
Earl E. Schoessow, Lynchburg, Va., assignor to The Babcock & Wilcox Company, New York, N.Y., a corporation of New Jersey
Filed Mar. 25, 1957, Ser. No. 648,422
5 Claims. (Cl. 204—193.2)

This invention relates in general to a nuclear reactor and more particularly, it relates to an arrangement which provides both forced and natural circulation cooling in a heterogeneous light water moderated pool type reactor.

A typical nuclear reactor which is used for research work is termed a pool type in which a critical amount of fissile material in the form of plate assemblies is suspended in a pool of water. A typical type of installation of this type is currently in use at the Bulk Shielding Facility at the Oak Ridge National Laboratory and is described in "Research Reactors—Selected Reference Material—United States Atomic Energy Program"—Government Printing Office, 1955. This type of reactor has been previously designed to operate continuously at low power level in the order of 50 to 100 kilowatts and the cooling of the fuel plate assemblies has been accomplished by the natural circulation of water through the fuel plate assemblies. The temperature of the water in the pool was maintained by the natural heat losses of the system.

It is desirable for many nuclear experiments to have a neutron intensity emanating from the core greater than that which would be associated with these low power levels while still maintaining the ease and convenience of this type of reactor. Accordingly, the present invention provides a cooling arrangement for the core of a pool type reactor adapted for forced circulation cooling of the core, but which is also arranged to allow natural circulation cooling of the core during certain abnormal conditions.

The invention further provides a means for positioning a pool suction header so that it causes forced circulation when in one position and permits natural circulation cooling when in a second position.

Additionally, there is provided means for positioning the header from a level above the pool such that natural circulation will be permitted when the circulating medium is not operative.

The various features of novelty which characterize the invention are pointed out with particularly in the claims annexed to and forming a part of this specification. For a better understanding of the invention, its operating advantages and specific objects attained by its use, reference should be had to the accompanying drawings and descriptive matter in which are illustrated and described preferred embodiments of the invention.

FIG. 1 is an isometric view of a pool type reactor embodying the present invention.

FIG. 2 is an isometric view in larger scale showing the arrangement of the invention within the pool reactor.

FIG. 3 is a schematic of the header operator mechanism.

The pool type reactor generally comprises concrete walls 10 and floor 12 defining a generally rectangular shaped pool open at the top thereof. Tracks 14 are imbeded in concrete at the top of the pool walls on which is mounted a structural bridge 16 adapted to ride on the tracks. Hanging from the bridge is a suspension frame 18. This frame at its lower end supports a core 20 of the reactor. The pool is normally filled with light water 22 to a level several feet above the core 20. Means are provided in the bridge 16 to move it longitudinally along the track and to hold the various control mechanisms for the reactor. The lower portion of the walls 10 of the pool are pierced by beam ports 24 which may be used for various nuclear experiments.

A water inlet 26 and an outlet 28 are located in the floor 12 of the pool. Both of these are connected to a water cooling circulation system 29, shown schematically, which is provided with heat exchange means to remove the heat from the circulating water and carry it away in a service cooling system 29A.

The lower end of the suspension frame 18 is provided with a matrix plate 30 of rectangular slab construction having a plurality of cylindrical holes 31 therethrough at uniform spacing. In these holes there is positioned one end of plurality of vertically extending plate type fuel element assemblies 32. A plurality of these fuel assemblies placed longitudinally contiguous to each other in sufficient quantity provided a nuclear core 20 in which there can be sustained a chain reaction. There are provided a number of control rods 34 and instruments 35 at spaced intervals within the core which are used to regulate the activity of the core. The control rods may contain high neutron absorption material such as boron or cadmium and are arranged to be vertically moved by a control mechanism on the bridge structure 16.

Attached to the lower portion of the frame 10 below the matrix plate 30 there is formed a hopper 36 of rectangular cross section having its large end fitted to the bottom of the frame 18 in such a manner that the interior of the hopper is directly in communication with the flow channels of the fuel elements 32 through the holes 31 in the matrix plate 30. Thus the hopper may be said to be fitted to the bottom of the reactor core 20. The lower smaller end of the hopper has an elongated opening 38 adapted to fit and receive a longitudinal portion of a cylinder.

Below the hopper there is positioned a pool suction header 40 formed as an L-shaped round conduit. The header has a short leg 42 which is fitted to a flange 43 on the water outlet 26 in such a manner that the header 40 may be rotated at the flange and thus prescribe a movement in a vertical plane (as shown by heavy arrow) coinciding with the center line of the opening 38 in the hopper 36. The suction header 40 has the long leg 44 adapted with a longitudinal opening therein which coincides with the shape of the opening 38 of the hopper 36 and has its one end closed by an end plate 48. A lifting lug 50 is rigidly attached to the end of the plate 48 and is engaged by a hook member 52 which in turn is attached to a vertically extending positioning bar 54. The positioning bar extends along the edge of the frame 18 upwardly to the bridge 16. Sleeve type guides 56 are attached to the frame 20 to allow vertical movement of the bar without any substantial lateral movement.

There is a header support pedestal 58 arranged directly below the pool suction header 40 and which acts as a rest for the pool suction header when it is at its lowermost position (as shown in dotted lines). This provides two positions for the header 40; an upper normal first position and a second position resting on the pedestal 58.

As shown in FIGURE 3, there is a pool header bar actuating means 59 arranged to normally hold the pool header 40 in its first or upper position to effect the forced flow of cooling water downwardly through the core 20. The means includes pivoted jaws 60 arranged to hold the bar 54 up by a shoulder 62. A spring means 63 is arranged to urge the bar 54 downwardly upon release of the jaws 60. The jaws are opened by a soft iron solenoid operator 64 consisting of a core member 66 arranged to fall but which is normally held up by the electromagnetic coil 68. The coil is connected in parallel with the electric motor which drives the pool circulating water pump. Thus when the current ceases to the pump, the coil is de-energized allowing the core member 66 to drop and force open the jaws 60. The spring 63 drives the bar 54 downward with the resultant change in position of the suction header 40. The bar 54 is arranged to be manually lifted back to the normal uppermost position by the handle 70 (in FIG. 2).

Under normal circumstances the bridge 16 is positioned such that the core 20 and the hopper 36 are directly above pool suction header 40. Also, at this time the positioning bar 54 has its hook 52 engaging the lug 50 on the pool suction header with the soft iron core 66 in position within the solenoid 64. Under such a condition the pump motor is energized and the pool suction header is held in its normal or first position. In this position the pool suction header registers with the opening 38 of the hopper and causes a suction therein to induce the flow of water from the pool down through the fuel elements 32 of the core 20 into the hopper, suction header and out the outlet 26 to thus produce a forced circulation cooling of the core. There may arise circumstances such as electrical power failures during the nuclear operation of the core when the pump motor may become de-energized and the forced circulation of water ceases. Under such circumstances the solenoid coil 68 is de-energized and the soft iron core 66 fall by the action of gravity, thus dropping the pool suction header 40 to its second position, resting on the pedestal 58. In this second position, the suction header is away from the opening 38 in the hopper so that there is free communication from the pool 22 to the interior of the fuel plate assemblies 32. It follows, therefore, that any heat generated by nuclear reactions in the fuel plates will be transmitted to the water in the channels of the fuel plate assemblies with the heated water rising and being replaced by the cooler water. Thus a thermal siphonic action is started which will cause the heat to be carried away from the fuel elements. In the event that large quantities of heat must be removed, the pool temperature will go to saturation and steam will be formed in the flow channels. The heat of vaporization of the water will maintain the reactor cool during these excursions and the safety rods would secure the reaction. Naturally, the reactor is arranged to be scrammed when a power failure occurs.

The pool suction header is therefore arranged so that under normal circumstances it is engaged with the hopper and induces a forced circulation flow through the core to cool it and transport this heat to an external heat exchanger. By virtue of this arrangement, there is safe and positive cooling of the core which justifies operation of the core at heat levels up to as high as 500 to 1000 kilowatts. Also by providing for two positions of the pool suction header, the reactor is capable of being cooled by natural circulation in the event that forced circulation ceases or the reactor is operated at a different position in the pool or at very low power level. Consequently, the rotatable pool suction header materially enhances the operation of the reactor so as to make it more adaptable as a research tool yet maintaining a high degree of safety.

While in accordance with the provisions of the statutes, there is illustrated and described herein specific forms of the invention, those skilled in the art will understand that changes may be made in the form of the invention covered by the claims, and that certain features of the invention may sometimes be used to advantage without a corresponding use of the other features.

What is claimed is:

1. In a pool type nuclear reactor having a plurality of vertically disposed fuel plate assemblies arranged as a core suspended in a pool of water and a forced circulation cooling water inlet and outlet from said pool, a movable suction header in said pool attached to said outlet and arranged to withdraw water from the pool therethrough, said header mounted on said outlet and positionable at first and second positions, said first position having the header directly coupled to said core for causing the forced flow of water therethrough, said second position having said header spaced from said core to allow natural circulation cooling of core by the pool water, means for positioning said header in both positions including a positioning bar detachably connected to said header and extended to and controlled from a location above said water pool, and pool header actuating means holding said header in said first position and actuating said bar to position said header in said second position in response to a predetermined signal which is indicative of the cessation of a forced water circulation through said header.

2. In a pool type nuclear reactor having a plurality of vertically disposed fuel plate assemblies arranged as a core suspended in a pool of water and a forced circulation cooling water inlet and outlet from said pool, a movable suction header in said pool attached to said outlet and arranged to withdraw water from the pool therethrough, said header mounted on said outlet subjacent said core and positionable at first and second positions, said first position having the header directly coupled to said core for causing the forced flow of water downwardly therethrough, said second position having said header spaced from said core to allow natural circulation cooling of core by the pool water, means for positioning said header in both positions, including a positioning bar detachably connected to said header and extending to and controlled from a location above said water pool, and pool header actuating means holding said header in said first position and actuating said bar to position said header in said second position in response to a predetermined signal which is indicative of the cessation of forced water circulation through said header.

3. In a pool type nuclear reactor having a plurality of vertically disposed fuel plate assemblies arranged as a core suspended in a pool of water and a forced circulation cooling water inlet and outlet from said pool, a movable suction header in said pool attached to said outlet and arranged to withdraw water from the pool therethrough, said header mounted on said outlet subjacent said core and positionable at first and second positions, said first position having the header directly coupled to said core for causing the forced flow of water downwardly therethrough, said second position having said header spaced from said core to allow natural circulation cooling of core by the pool water, a hopper of rectangular cross-section having its large end fitted to the bottom of said core and opening directly to the flow channels of said fuel plate assemblies, the smaller end having an elongated opening adapted to fit and receive the upper longitudinal one half of a cylindrical header, said header having a longitudinal opening coinciding with the opening in said hopper when in said first position, and means for positioning said header in both positions including a positioning bar detachably connected to said header and extending to and controlled from a location above said water pool, pool header actuating means holding said header in said first position and actuating said bar to position said header in said second position in response to a predetermined signal which is indicative of the cessation of forced water circulation through said header.

4. In a pool type nuclear reactor having a plurality of vertically disposed fuel plate assemblies arranged as a core suspended in a pool of water and a forced circulation cooling water inlet and outlet from said pool, a movable suction header in said pool attached to said outlet and arranged to withdraw water from the pool therethrough, said header mounted on said outlet subjacent said core and positionable at first and second positions, said first position having the header directly coupled to said core for causing the forced flow of water downwardly therethrough, said second position having said header spaced from said core to allow natural circulation cooling of core by the pool water, a hopper of rectangular cross-section having its large end fitted to the bottom of said core and opening directly to the flow channels of said fuel plate assemblies, the smaller end having an elongated opening adapted to fit and receive the upper longitudinal one half of a cylindrical header, said header having a longitudinal opening coinciding with the opening in said hopper when in said first position, and means for positioning said header in both positions, including a positioning bar detachably connected to said header and extending to and controlled from a location above said water pool, pool header actuating means holding said header in said first position and actuating said bar to position said header in said second position in response to a predetermined signal which is indicative of the cessation of forced water circulation through said header, said actuating means including an electromagnetic solenoid operator associated with the upper end of said bar and arranged to drop the header to its second position upon receiving said signal.

5. In a pool type nuclear reactor having a plurality of vertically disposed fuel plate assemblies arranged as a core suspended in a pool of water and a forced circulation cooling water inlet and outlet from said pool, a movable suction header in said pool attached to said outlet and arranged to withdraw water from the pool therethrough, said header mounted on said outlet subjacent said core and positionable at first and second positions, said first position having the header directly coupled to said core for causing the forced flow of water downwardly therethrough, said second position having said header spaced from said core to allow natural circulation cooling of the core by the pool water, a hopper of rectangular cross-section having its large end fitted to the bottom of said core and opening directly to the flow channels of said fuel plate assemblies, the smaller end having an elongated opening adapted to fit and receive the upper longitudinal one half of a cylindrical header, said header having a longitudinal opening coinciding with the opening in said hopper when in said first position, and means for positioning said header in both positions including a positioning bar detachably connected to said header and extending to and controlled from a location above said water pool, pool header actuating means holding said header in said first position and actuating said bar to position said header in said second position in response to a predetermined signal which is indicative of the cessation of forced water circulation through said header, said actuating means including an electromagnetic solenoid operator associated with the upper end of said bar and arranged to drop the header to its second position upon receiving said signal, and a spring urging said bar downwardly against the holding power of said actuating means.

References Cited in the file of this patent
UNITED STATES PATENTS

| | | |
|---|---|---|
| 2,574,309 | Wood | Nov. 6, 1951 |
| 2,639,196 | Glaza | May 19, 1953 |

OTHER REFERENCES

Breazeale et al.: "International Conference on the Peaceful Uses of Atomic Energy," vol. 2, page 420, August, 1955. (Copy in Scientific Library.)